United States Patent
Sarkar et al.

(10) Patent No.: US 10,647,930 B2
(45) Date of Patent: May 12, 2020

(54) REACTOR SYSTEM AND PROCESS FOR UPGRADING HEAVY HYDROCARBONACEOUS MATERIAL

(71) Applicant: INDIAN OIL CORPORATION LIMITED, Mumbai (IN)

(72) Inventors: Mainak Sarkar, Faridabad (IN); Darshankumar Manubhai Dave, Faridabad (IN); Ramesh Karumanchi, Faridabad (IN); Madhusudan Sau, Faridabad (IN); Ganesh Vitthalrao Butley, Faridabad (IN); Nepal Vishwakarma, Faridabad (IN); Kamal Kumar, Faridabad (IN); Pravesh Kumar, Faridabad (IN); Sarvesh Kumar, Faridabad (IN); Debasis Bhattacharyya, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 6 days.

(21) Appl. No.: 16/118,332

(22) Filed: Aug. 30, 2018

(65) Prior Publication Data

US 2019/0100705 A1 Apr. 4, 2019

(30) Foreign Application Priority Data

Sep. 29, 2017 (IN) .............................. 201721034750

(51) Int. Cl.
*C10G 47/24* (2006.01)
*C10G 47/00* (2006.01)
(Continued)

(52) U.S. Cl.
CPC .............. *C10G 47/24* (2013.01); *B01J 4/002* (2013.01); *B01J 4/004* (2013.01); *B01J 8/12* (2013.01);
(Continued)

(58) Field of Classification Search
CPC combination set(s) only.
See application file for complete search history.

(56) References Cited

U.S. PATENT DOCUMENTS 5,580,531 A * 12/1996 Vassiliou ............ B01F 3/04049
261/129
2007/0138061 A1 * 6/2007 Costinel ................ B01F 5/0057
208/107

(Continued)

*Primary Examiner* — Ali Z Fadhel
(74) *Attorney, Agent, or Firm* — Maschoff Brennan

(57) ABSTRACT

The present invention relates to a hydrocracking reactor system and a process utilizing the same for upgrading heavy hydrocarbonaceous material to value-added products. Accordingly, an aspect of the present invention includes dispersing a liquid feedstock pre-mixed with a catalyst from top of a reactor vessel to obtain dispersed droplets having a predetermined droplet size less than 500 μm, introducing a gaseous feed comprising primarily of hydrogen from bottom of the reactor vessel to form a continuous gaseous phase throughout a cross-section of the reactor vessel, and allowing the dispersed droplets to contact the continuous gaseous phase throughout the cross-section of the reactor vessel to form reaction effluent comprising one or more lighter product hydrocarbons. The method may further include removing at least a top portion and at least a bottom portion of the reaction effluent from the reactor vessel.

16 Claims, 6 Drawing Sheets

(51) Int. Cl.
*C10G 47/26* (2006.01)
*B01J 4/00* (2006.01)
*B01J 8/12* (2006.01)

(52) U.S. Cl.
CPC .............. *B01J 8/125* (2013.01); *C10G 47/00* (2013.01); *C10G 47/26* (2013.01); *B01J 2208/00911* (2013.01); *B01J 2219/185* (2013.01); *B01J 2219/1943* (2013.01); *C10G 2300/206* (2013.01); *C10G 2300/80* (2013.01)

(56) References Cited

U.S. PATENT DOCUMENTS

| | | | |
|---|---|---|---|
| 2007/0155985 A1* | 7/2007 | Wonders | B01J 4/002 562/413 |
| 2007/0155986 A1* | 7/2007 | Wonders | B01J 4/002 562/413 |
| 2016/0310925 A1* | 10/2016 | Steynberg | B01J 8/22 |
| 2018/0009662 A1* | 1/2018 | Simanzhenkov | B01F 5/06 |

* cited by examiner

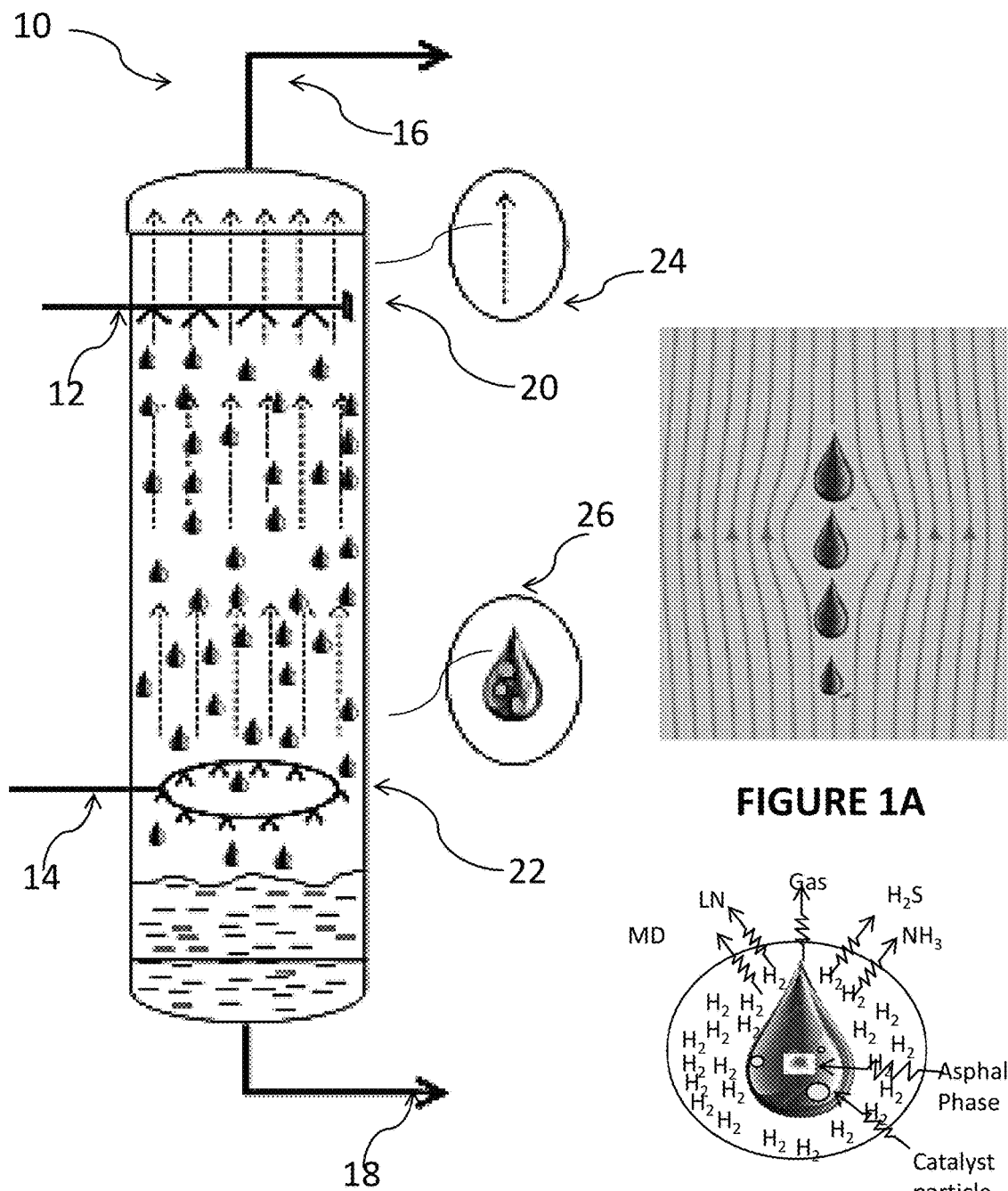
FIGURE 1
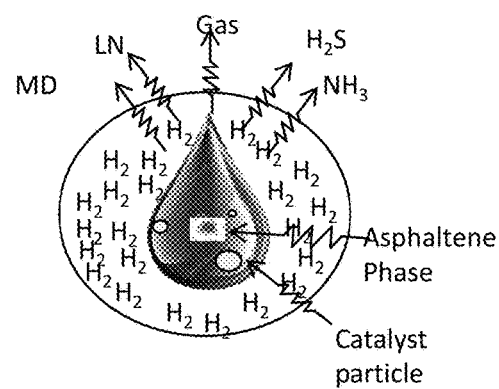
FIGURE 1A
FIGURE 1B

REACTOR SYSTEM AND PROCESS FOR UPGRADING HEAVY HYDROCARBONACEOUS MATERIAL

FIELD OF THE INVENTION

The present invention is related to design of reactor system and using the same for upgrading heavy hydrocarbonaceous material (viz. vacuum residue, atmospheric residue, bitumen etc.) to value-added products such as fuel and lubricant in presence of hydrogen and catalyst. More precisely, the present invention discloses the design of a hydrocracking reactor system suitable for processing heavy hydrocarbonaceous feed streams in presence of homogeneous or slurry type catalyst system. The invention further discloses process configuration using the said reactor system.

BACKGROUND OF THE INVENTION

The demand for the refined fossil fuels is growing drastically but the supply of high-quality crude oil is depleting. It is well-established fact that the balance of crudes that need to be processed still contains a significant amount of heavy fractions. Further, due to stringent environmental norms and particularly new sulphur regulation for Bunker fuels, easy avenues for disposal of residue oil no longer exists.

Upgrading residue to value-added products can be done, according to the available literature, using any of the 3 routes, (i) carbon rejection, (ii) hydrogen addition & (iii) combination of both. Carbon rejection route includes processes such as visbreaking, solvent deasphalting, thermal cracking (coking) and Fluidized catalytic cracking (FCC). Hydrocracking is hydrogen addition route. The processes like solvent deasphalting, visbreaking, and coking, produce a significant amount of low-value by-products and their products require extensive post treatments viz. HDS, HDN, and HDM. However, due to lower investment cost, these processes are very popular. Another technology for upgrading residue is Resid FCC or RFCC. The main disadvantage of this process is that it cannot handle feeds with high CCR.

The hydrogen addition route consumes a substantial amount of hydrogen and is relatively high in investment and operating costs. However, with product specifications becoming stringent and increasing demand for diesel, the hydrogen addition routes are gaining importance.

Based on the types of the reactor the residue hydrocracking processes, in general, are classified as (i) Fixed bed hydrocracking, (ii) Ebullated bed hydrocracking and (iii) Slurry hydrocracking.

The fixed bed hydrocracking process for upgrading residue is similar to other fixed bed hydrocracking processes, where the feed and hydrogen are passed over the catalyst bed at a particular temperature and pressure. However, because of the much higher level of impurities (metal, asphaltene etc.) in the residue compared to other distillates, the operation of fixed bed process is not easy as compared to other fixed bed processes. The asphaltene molecules in vacuum residue remain in suspended form. The stability of this colloidal mixture may get disturbed due to any physical and/or chemical changes and may lead to precipitation of the asphaltene molecules. This phenomenon is called phasing out of asphaltene. Because of the high level of impurities and simultaneous phasing out of asphaltene from the solution, the ΔP across the catalyst bed increases very rapidly for fixed bed residue hydrocracking. In fixed bed hydrocracking process, the problem of high level of impurities is generally handled by multiple trains of treating reactors and the problem of phasing out of asphaltene molecules is addressed by reducing the overall conversion.

Ebullated bed reactors are one of the types of fluidized bed reactor that utilizes ebullition, or bubbling, to achieve an appropriate distribution of reactants and catalysts. The ebullated bed is mostly applicable for the feedstocks which are difficult to process in fixed-bed or plug flow reactors due to high levels of contaminants. The ebullated bed reactors offer high-quality, continuous mixing of liquid and catalyst particles and have the characteristics of the stirred reactor. The catalyst used for the ebullated bed is about 0.8-mm diameter extrudate and is held in a fluidized state through the upward lift of recycle liquid reactants and products. The liquid and gas enter the reactor plenum and are distributed across the bed through a distributor and grid plate. The height of the ebullated catalyst bed can be controlled by the rate of liquid recycle flow. The operability of ebullated unit is mainly affected by deposit formation. In residue hydrocracking process, deposit formation takes place mainly because of phasing out of asphaltene molecules. The phasing out of asphaltene molecules occurs because of incompatibility of hydrocracked products with the asphaltene molecule. The hydrocracked products have in general lower aromatic content and this tends to makes the mixture unstable and causes precipitation of asphaltene molecules. The asphaltene precipitation is controlled by limiting the conversion of residue and increasing recycling ratio. Sometimes, the stabilizers are also used for making the asphaltene molecules stable. Another, limitation of ebullated bed reactor is reaction kinetics. The order of hydrocracking reaction is between 1 and 2 and hence plug flow reactor is better than a stirred reactor. As the characteristic of the ebullated reactor is same as stirred reactor hence the conversion is affected. Further, the operability of ebullated bed reactor is much complex compared to fixed bed reactor. However, the ebullated bed reactor is preferred over the fixed bed reactor for residue hydrocracking.

Slurry reactors can process feeds with very high metal and CCR contents. Slurry reactors are basically three-phase reactors and usually consist of catalyst (solid), suspended in a liquid through which hydrogen gas is bubbled. In conventional slurry reactors, also commonly known as Slurry Bubble Column reactors, which are generally used for hydrocracking of vacuum residue, the feed, the catalyst, and hydrogen are introduced from the reactor bottom and effluent is withdrawn from the top. The reactor is basically a hollow cylinder with some arrangement for mixing and redistributing the hydrogen into the reaction mixture. Hydrocracking reaction takes place while traveling from the bottom to the top. Although the slurry reactors have an advantage of efficiently converting poor quality feedstocks compared to the other hydrocracking processes described above, it also suffers from the following disadvantages:

i. Asphaltene precipitation and choking of reactor and downstream equipment: This happens because the hydrocracked products are incompatible with asphaltene molecules because of lower aromatic concentration. As the hydrocracking reaction takes place, the delicate balance between asphaltene, resin and aromatics get disturbed and cause asphaltene molecules to precipitate.
  ii. Coke formation and choking of the reactor and downstream equipment: In the conventional slurry reactor, the problem of coke formation is very critical and this happens due to improper distribution of hydrogen, agglomeration of coke precursor etc. In the present slurry reactor system, the hydrocarbon is in the continuous phase and the hydrogen is bubbled through it. This results in an improper contact between the hydrocarbon and the hydrogen which gets further deteriorated during the course of travel through the reactor.

iii. Secondary cracking: In conventional slurry reactor system, the product remains in the reaction mixture along with the unconverted feed till end in the reactor. This causes over cracking of heavy middle distillate and middle distillate to lighter hydrocarbon, particularly, light naphtha and gases.

The deficiencies of conventional Slurry reactor system, have been addressed in the present invention.

SUMMARY OF THE INVENTION

The present invention as embodied and broadly described herein discloses the design of reactor system process configuration using the same for upgrading heavy hydrocarbonaceous material into valuable hydrocarbons products. The hydrocracking reactor system and the process using the same reactor system reduces (i) secondary cracking of middle and heavy middle distillate to a considerable extent, (ii) reduce coke formation (iii) prevent precipitation of asphaltene molecules, thereby increases per-pass and total conversion of heavy hydrocarbonaceous feed, improve selectivity of middle distillate and reduce hydrogen consumption One aspect of the present invention is to provide a hydrocracking reactor system and utilizing the same for upgrading heavy hydrocarbonaceous material into valuable hydrocarbon products, wherein the reactor system comprises of assembly for achieving a controlled droplet size of the liquid feedstock premixed with a catalyst. In a preferred embodiment, the hydrocracking reactor system comprises of a reactor vessel, a first inlet for receiving a liquid feedstock pre-mixed with a catalyst where the first inlet is in communication with the top of the reactor vessel and a second inlet for receiving a gaseous feed comprising of hydrogen where the second inlet is in communication with bottom of the reactor vessel. Further, the hydrocracking reactor system comprise of a spray arrangement to obtain droplets having a predetermined droplet size less than 500 μm. In one embodiment, the spray arrangement includes a plurality of nozzles configured to disperse the liquid feedstock pre-mixed with the catalyst from the top of the reactor vessel. Further, the hydrocracking reactor system comprises of a sparger arrangement, the sparger arrangement including a plurality of sparger holes to introduce the gaseous feed comprising hydrogen from the bottom of the reactor vessel to form a continuous gaseous phase throughout a cross-section of the reactor vessel. Further, the hydrocracking reactor system comprises of a top exit in communication with the top of the reactor vessel for removing at least a top portion of an upstream flow of reaction effluent in the reactor vessel. The reaction effluent comprises of one or more lighter product hydrocarbons formed during contact of the dispersed droplets with the continuous gaseous phase throughout the cross-section of the reactor vessel. Further, the hydrocracking reactor system comprises of a bottom exit in communication with the bottom of the reactor vessel for removing at least a bottom portion of a downstream flow of the reaction effluent in the reactor vessel.

In accordance with an embodiment of the present invention, the plurality of nozzles is arranged symmetrically within the spray arrangement across the cross-section of the reactor vessel.

In accordance with an embodiment of the present invention, the spray arrangement may comprise of one or more concentric pipes for receiving the liquid feedstock pre-mixed with the catalyst from the first inlet, the one or more concentric pipes being arranged across the top cross-section of the reactor vessel.

In accordance with an embodiment of the present invention, the reactor vessel may comprise of one or more intermediate collection and redistribution arrangements at one or more collection and redistribution points in the reactor vessel.

In accordance with an embodiment of the present invention, the reactor vessel may comprise of an asphaltene stabilizer injection arrangement to introduce an asphaltene stabilizer into the hydrocracking reactor vessel.

By virtue of the assembly of the hydrocracking reactor system as provided in the present invention, a part of the hydrocracked product is continuously stripped off by the hydrogen gas flowing upwards from the bottom to the top of the reactor vessel. The continuous stripping off the lighter hydrocarbonaceous material from the unconverted material increases stability of the unconverted material and prevents phasing out of asphaltene molecules from the hydrocarbon catalyst mixture (reaction medium). Further, the extent of coke formation during the hydrocracking process is reduced because the feed is sprayed as small doplets and is thus uniformly dispersed in the stream of hydrogen which is maintained in the continuous phase in the reactor vessel. Therefore, transfer of hydrogen from the gas phase into the reaction medium, i.e., the droplet is facilitated more compared to slurry bubble column reactor. The coke formation is reduced because of (i) better hydrogenation of coke precursors (ii) confining coke precursors within discrete droplets and have no chance to agglomerate with other coke precursors. Also, because the lighter hydrocarbons produced during the reaction is continuously stripped of from the reaction mixture, over cracking of the products is reduced.

Another aspect of the present invention is to provide a hydrocracking process of upgrading heavy hydrocarbonaceous material into valuable hydrocarbon products using the hydrocracking reactor system, where the process comprises of dispersing a liquid feedstock pre-mixed with a catalyst from top of a reactor vessel to obtain dispersed droplets having a controlled droplet size that prevents asphaltene conversion and coke formation and thus substantially increases the conversion rate of the heavy hydrocarbonaceous material. In a preferred embodiment, the hydrocracking process comprises of dispersing a liquid feedstock pre-mixed with a catalyst from the top of a reactor vessel to obtain dispersed droplets having a predetermined droplet size less than 500 μm. Further, the hydrocracking process comprises of introducing a gaseous feed comprising primarily of hydrogen from bottom of the reactor vessel to form a continuous gaseous phase throughout a cross-section of the reactor vessel. The hydrocracking process may further comprise of allowing the dispersed droplets to contact the continuous gaseous phase throughout the cross-section of the reactor vessel to form reaction effluent comprising one or more lighter product hydrocarbons. The method may further comprise of removing at least a top portion and at least a bottom portion of the reaction effluent from the reactor vessel.

In accordance with the present embodiment of the invention, the liquid feedstock pre-mixed with the catalyst is uniformly dispersed from the top of the reactor vessel throughout the cross-section of the reactor vessel, to obtain the dispersed droplets.

In accordance with one embodiment of the present invention, the pre-determined droplet size is in a range of 50 μm to 500 μm.

In accordance with an embodiment of the present invention, the hydrocracking process comprises of continuously stripping off at least a portion of the one or more lighter product hydrocarbons by the gaseous feed during downstream flow of the dispersed droplets in the reactor vessel.

In accordance with an embodiment of the present invention, the hydrocracking process comprises of introducing an asphaltene stabilizer into the reactor vessel.

In accordance with an embodiment of the present invention, the hydrocracking process comprises of collecting the dispersed droplets and redistributing the collected dispersed droplets during the downstream flow of the dispersed droplets at one or more collection and redistribution points in the reactor vessel. In one such embodiment, the hydrocracking process may further comprise of introducing the asphaltene stabilizer at the one or more collection and redistribution points in the reactor vessel.

Another tacit aspect of the present inventive design disclosed herein is to provide, kinetic advantage to the reactions that are required for upgrading heavy hydrocarbonaceous material to lighter and value added products. Among variety of reactions that may occur within the reactor system, the two most prominent reactions are (i) thermal cracking of heavy hydrocarbons to lighter substrates and (ii) hydrogenation reaction of unsaturated compounds (radicals, olefines and aromatics). The order of both the reactions are between 1 and 2. The fundamentals of reaction engineering teaches the fact that any reaction kinetics with order greater than or equal to 1, the conversion of reactant to product is more in case of plug flow reactor (PFR) compared to same volume of continuous stried tank reactor (CSTR). By virtue of design of the reactor system, the plug flow profile is automatically maintained within the reactor. The droplet which flows through the reactor vessel acts like a discrete reactor within itself. This aspect of the hydrocracking reactor system offers better conversion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 1, 1A and 1B illustrate a schematic representation of a hydrocracking reactor system in accordance with an embodiment of the present invention.

Figures 2A, 2B, 2C:
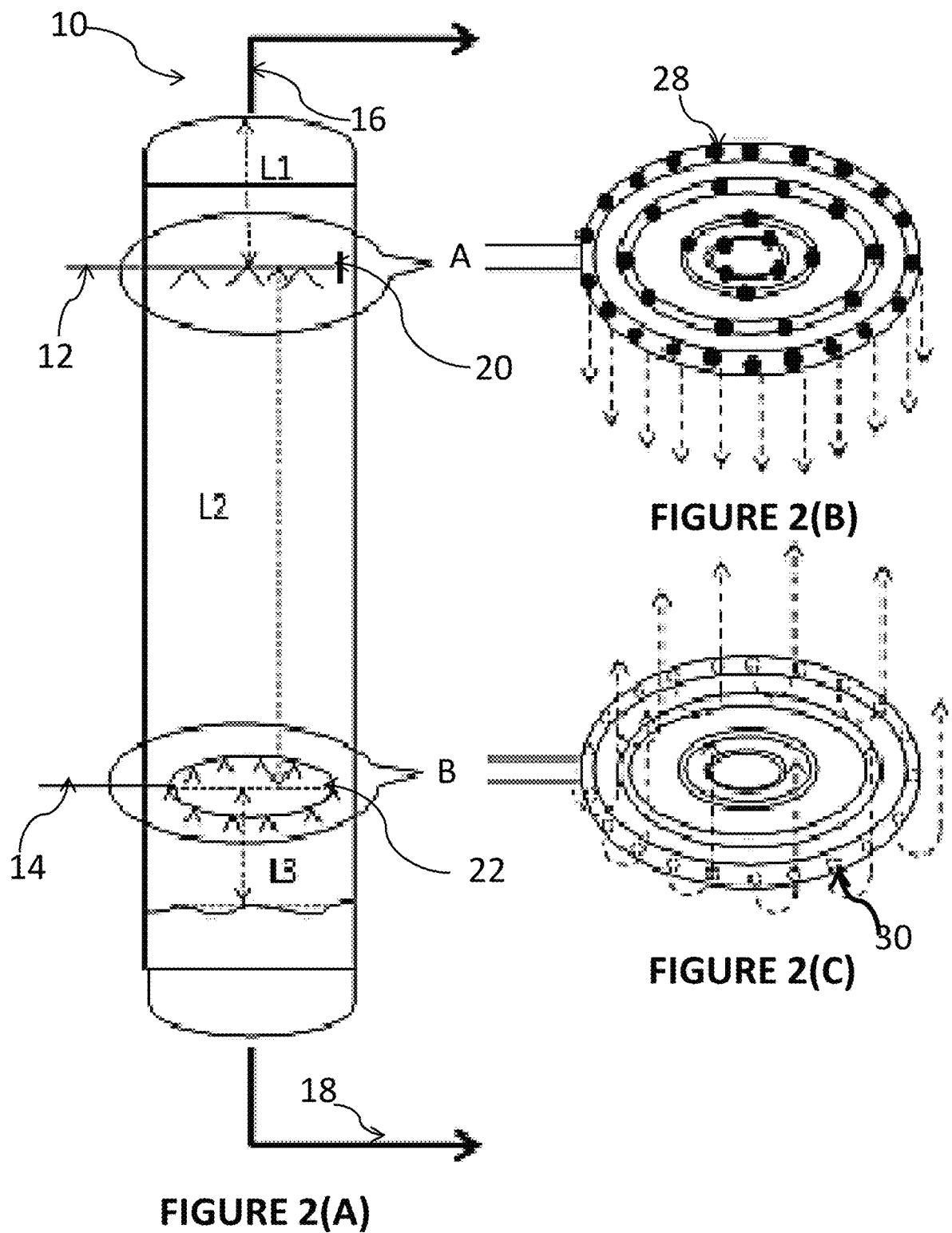
FIGS. 2(A), 2(B) and 2(C) illustrate a detailed schematic representation of a hydrocracking reactor system in accordance with an embodiment of the present invention.

Further, skilled artisans will appreciate that elements in the drawings are illustrated for simplicity and may not have been necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" are defined as meaning "no embodiment, or one embodiment, or more than one embodiment, or all embodiments."

The terminology and structure employed herein is for describing, teaching and illuminating some embodiments and their specific features and elements and does not limit, restrict or reduce the scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility, and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

The present invention relates to a reactor vessel for upgrading a heavy hydrocarbonaceous material (viz. vacuum residue, atmospheric residue, bitumen etc.) to value-added products such as fuel and lubricant in presence of hydrogen and catalyst. FIG. 1 discloses a hydrocracking reactor system including at least a reactor vessel 10 in accordance with the various embodiments of the present invention. The reactor vessel 10 shall be hereafter referred to as the 'reactor' 10 in the present disclosure. In an embodiment, the reactor 10 is a hollow metallic cylinder. The height of the reactor 10 may be selected based on reaction time and a velocity of matter falling from the top of the reactor 10. As illustrated in FIG. 1, a first inlet 12 in communication with top of the reactor 10 receives a liquid feedstock pre-mixed with a catalyst, and a second inlet 14 in communication with bottom of the reactor 10 receives a gaseous feed, which may include fresh hydrogen ($H_2$) gas. In the embodiment illustrated in FIG. 1, the first inlet 12 is positioned at the side-top portion of the reactor 10 and the second inlet 14 is positioned at the side-bottom portion of the reactor 10. Further, a top exit 16 in communication with the top of the reactor 10 removes at least a top portion of reaction effluent, also referred to as 'top effluent' or 'top stream' from the reactor 10 where the top effluent comprises of one or more lighter products hydrocarbon converted during the reaction and flowing in the upstream of the reactor 10. Further, a bottom exit 18 in communication with the bottom of the reactor 10 removes at least a bottom portion of the reaction effluent, also referred to as 'bottom effluent', or 'bottom stream', which may be collected at the bottom of the reactor 10 and comprise of one or more lighter products hydrocarbon converted during the reaction and flowing in the downstream of the reactor 10. Additionally, FIG. 1 illustrates an arrangement 20 in communication with the first inlet 12 where the arrangement 20 may be positioned proximate to a top-most portion of the reactor 10 and an arrangement 22 in communication with the second inlet 14 where the arrangement 22 may be positioned proximate to a bottom-most portion of the reactor 10. The arrangement 20 shall be referred to as the 'spray arrangement' 20' and the arrangement 22 may be referred to as the 'sparger arrangement' 22 in the foregoing description. The details of these arrangements shall be explained with reference to FIG. 2. The arrow 24 with dotted lines and pointing upwards represents the upwards flow of the gaseous feed in the reactor 10 and the droplet 26 represents the dispersed droplets of the liquid feedstock pre-mixed with the catalyst, inside the reactor 10. The dispersed droplets are obtained by uniformly dispersing the liquid feedstock pre-mixed with the catalyst from the top of the reactor vessel 10 throughout the cross-section of the reactor vessel 10.

The liquid feedstock which constitutes one of the reactants of the present invention is introduced from the top of the reactor through the first inlet 12 either in slurry phase or preferably in the liquid phase. The liquid feedstock which is introduced from the first inlet 12 may also be referred to as feed-1 in the present disclosure. The feed-1 may be any hydrocarbonaceous material or a mixture thereof such as a hydrocarbonaceous material derived from vegetable sources or petroleum sources or from destructive distillation of coal or coal slurry or mixture thereof. Further, the feed-1 may have conradson carbon more than 15 wt % in one embodiment. In another embodiment, the feed 1 may have conradson carbon more than 20 wt %. In yet another embodiment, the feed-1 may have conradson carbon more than 25 wt %. Further, the feed-1 may have asphaltene content more than 5 wt % in one embodiment. In another embodiment, the feed 1 may have asphaltene content more than 8 wt %. In yet another embodiment, the feed-1 may have asphaltene content more than 11 wt %. The feed-1 may be introduced through the first inlet 12 into the reactor 10 at reaction conditions which may require the feed-1 to have an initial boiling point (IBP) above 400° C., preferably above 500° C. and most preferably above 560° C.

In accordance with an embodiment of the present invention, the feed-1 as introduced through the first inlet 12 is pre-mixed with a catalyst. In another embodiment, the catalyst is introduced through a catalyst system (not shown) along with the feed-1 through the first inlet 12 into the reactor 10. The catalyst for the process may be either mono-functional having only metal site or bi-functional having both acidic and metal site. The catalyst or catalyst system may be in slurry phase or in the liquid phase. The catalyst premixed with the feed-1 may either be present in dissolved form or uniformly dispersed form within the feed-1. In accordance with a preferred embodiment, the catalyst may be in the liquid phase soluble in the feed-1, if the catalyst is not in the dissolved form the catalyst is uniformly dispersed in the feed-1.

The gaseous feed which constitutes the other reactants of the present invention is introduced from the bottom of the reactor through the second inlet 14 at the reaction condition and may also be referred to as feed-2 in the present disclosure. The feed-2 remains in gaseous phase throughout the cross-section of the reactor 10 at the reaction conditions. By way of an example, feed-2 may include any gaseous mixture that can produce hydrogen under the reaction condition, or hydrogen-containing gaseous mixture or may include pure hydrogen only.

The reaction conditions may further include the reactor 10 to be maintained at a temperature ranging between 400° C.

to 700° C., in accordance with a preferred embodiment. In another embodiment, the reactor 10 may be maintained at a temperature ranging between 400° C. to 600° C. In yet another embodiment, the reactor 10 may be maintained at a temperature ranging between 420 and 500° C. Further, the reaction conditions may include the gaseous feed comprising hydrogen to have a hydrogen partial pressure between 70 barg to 220 barg, in accordance with a preferred embodiment. In another embodiment, the gaseous feed comprising hydrogen may have hydrogen partial pressures between 100 barg and 220 barg. In yet another embodiment, the gaseous feed comprising hydrogen may have a hydrogen partial pressure between 140 bar (g) and 180 bar (g).

In accordance with an embodiment of the present invention, the feed-1 pre-mixed with the catalyst is in a dispersed phase inside the reactor 10 and the feed-2 is in a continuous phase inside the reactor 10. In particular, the feed-1 pre-mixed with the catalyst is dispersed from the top of the reactor 10 to obtain the dispersed droplets of the feed-1 premixed with the catalyst and the feed-2 is introduced from the bottom of the reactor 10 in a manner that the gaseous feed forms a continuous phase across the cross-section of the reactor 10 where the contact of the dispersed droplets with the gaseous feed takes place. FIG. 1A illustrates the contact of the dispersed droplets with the gaseous feed in accordance with an embodiment of the present invention. In accordance with a further embodiment of the present invention, the dispersed droplets are dispersed in a manner to have a predetermined droplet as preferred in the present invention. In accordance with yet another embodiment of the present invention, the dispersed droplets are obtained by spraying the feed-1 premixed with the catalyst from the top of the reactor 10 in a manner so as to obtain uniform dispersion across the top cross-section of the reactor 10. This is achieved using the spray arrangement 20 as illustrated in FIG. 2B.

The present invention has a kinetic advantage that improves overall conversion of feed compared to the conventional slurry bubble column reactor. The order of major reactions that takes place within the reactor is greater than 1, which implies that plug flow hydrodynamic is preferred in the reactor vessel. Since the feed is flowing as discrete droplets, each droplet acts as a plug flow reactor. FIG. 1B illustrates how a droplet within the reactor 10 acts as a discrete reactor for the hydrocarbon feed that constitute the droplet itself in accordance with an embodiment of the invention. The droplet suspended in the stream of hydrogen rich gas, contains catalyst and gains heat from the surrounding hot hydrogen rich gas. Reactions take place within each droplet and the lighter products forms are stripped of along with the upward flowing gases. The reactions occur within the droplets while falling from a spray nozzle of the spray arrangement 20 to the bottom of the reactor vessel. Further, the reactions may include, but are not limited to, a thermal cracking reaction due to temperature within the reactor vessel 10, and a hydrogenation reaction due to presence of hydrogen and the catalyst within each droplet.

This phenomenon further concentrates the reactants within the droplet (droplet size reduces) and the rate of reaction does not affect much during the course of travel from top to bottom of the reactor. In case of slurry bubble column reactor, the reaction products remain within the reaction mixture. Hence, the rate of reaction reduces across the reactor length due to dilution effect. Also, since the reaction occurs in each discrete droplet, the possibility of coagulation of asphaltene molecules is only limited within each droplet. As the coagulation is restricted, the phenomenon of precipitation is also reduced.

FIG. 2 illustrates the detailed schematics of the spray arrangement 20 and the sparger arrangement 22 of the apparatus shown in FIG. 1. The spray arrangement 20 marked as 'A' in FIG. 2(A) and illustrated in detail in FIG. 2(B), may include a plurality of nozzles 28 configured to disperse the feed-1 pre-mixed with the catalyst from the top of the reactor 10 to obtain the dispersed droplets having a predetermined droplet size in accordance with a preferred embodiment. The plurality of nozzles 28 may be arranged symmetrically within the spray arrangement 20 across the top cross-section of the reactor 10. As illustrated in the embodiment in FIG. 1, the spray arrangement 20 may comprise of one or more concentric pipes in communication with the first inlet 12 for receiving the feed-1 premixed with the catalyst, wherein the one or more concentric pipes are arranged symmetrically across the top cross-section of the reactor 10. The feed-1 and the catalyst mixture are sprayed as small droplets from the top of the reactor 10 into the continuous stream of gaseous feed, for e.g., hydrogen-containing gaseous mixture, formed inside the reactor 10. Due to the assembly of the spray arrangement 20 positioned in a top portion of the reactor 10, as seen in FIG. 2, the droplets of the feed-1 pre-mixed with the catalyst are dispersed uniformly from the top of the reactor 10. Accordingly, a uniform flow of dispersed droplets is obtained throughout the cross-section of the reactor 10, hence each of the dispersed droplets are allowed to come in contact with the feed-2 present in continuous phase inside the reactor 10. This enhances the conversion rate of the feed-1 during the reaction phase inside the reactor 10.

In accordance with a preferred embodiment of the present invention, the pre-determined droplet size of the dispersed droplets may be less than 500 μm. In another preferred embodiment, the pre-determined droplet size is within a range of 50 μm to 500 μm. Accordingly, in an embodiment of the present invention the size of the nozzle 28 of the spray arrangement 20 is designed such that the droplet size of feed-1 and the catalyst mixture is preferably between 5 and 200 μm. In another preferred embodiment, the size of the nozzle 28 of the spray arrangement 20 is designed such that the droplet size of feed-1 and the catalyst mixture is preferably between more preferably between 10 and 100 μm. In yet another preferred embodiment, the size of the nozzle 28 of the spray arrangement 20 is designed such that the droplet size of feed-1 and the catalyst mixture is preferably between more preferably between 20 and 85 μm.

Further, the sparger arrangement 22 marked as 'B' in FIG. 2(A) and illustrated in detail in FIG. 2(C), may include a plurality of sparger holes 30 to introduce the feed-2 from the bottom of the reactor 10 to form a continuous gaseous phase throughout the cross-section of the reactor 10. In one embodiment, as illustrated in FIG. 2(C), the sparger arrangement 22 may comprises of concentric pipes similar to the construction of the spray arrangement 20, however other embodiments may also be possible to sparge the gaseous feed-2 into the reactor 10 such that the gaseous feed-2 forms a continuous phase inside the reactor 10. As illustrated in the embodiment in FIG. 1, the sparger arrangement 22 in communication with the second inlet 14 at the side-bottom of the reactor 10, receives the gaseous feed-2 which may include, for e.g., fresh hydrogen gas, and sparge the same using the sparger holes 30 inside the reactor 10. The directions of the sparger holes 30 may be directed radically facing the wall of the reactor 10 for preventing ingression of liquid into the sparger holes 30.

The feed-1 premixed with the catalyst is sprayed uniformly from the top cross-section of the reactor 10 using the spray nozzles 28 of the spray arrangement 20 positioned at the top cross-section of the reactor 10 so as to obtain the dispersed droplets having predetermined droplets size, i.e., preferably less than 500 μm. The dispersed droplets thereafter come in contact with the continuous stream of gaseous feed-2 as sparged from the bottom of the reactor 10 using the sparger holes 30 of the sparger arrangement 22 positioned at the bottom cross-section of the reactor 10. The hydrocarbonaceous material in presence of a catalyst in the form of small-sized dispersed droplets starts hydrocracking while moving in the downstream of the reactor 10 due to gravity through the continuous gaseous feed 2. In an embodiment, the hydrocarbonaceous material may hydrocrack at a temperature of 400° C. to 500° C. in the reactor 10.

During the course of travel from top to the bottom of the reactor 10, the heavy hydrocarbonaceous material starts converting to lighter hydrocarbonaceous material or products. The sulphur and nitrogen compounds present in feed-1 also convert to hydrogen sulphide ($H_2S$) and Ammonia ($NH_3$). As hydrogen is also consumed in the reaction hence the partial pressure of hydrogen also varies across the length of the reactor. The partial pressure of hydrogen is maximum at the bottom of the reactor 10 and minimum at the top of the reactor 10. The cross-flow of hydrocarbonaceous material and hydrogen is advantageous since the most refractory material enjoys the maximum partial pressure of hydrogen and hence better conversion of heaviest and refractory hydrocarbons occur.

As described earlier, the top effluent including, but not limited to, $H_2S$, $NH_3$, and unreacted Hydrogen, is withdrawn from the top portion of the reactor 10 through the top exit 16, as shown in FIGS. 1 and 2. Further, the bottom effluent including, but not limited to, heavy unreacted hydrocarbon and the vacuum residue, collected at the bottom portion of the reactor 10 is withdrawn the bottom exit 18, as shown in FIGS. 1 and 2.

In accordance with an embodiment the present invention discloses, the reaction effluent is formed by continuously stripping off at least a portion of the one or more lighter hydrocracked products by the gaseous feed-2, i.e., the hydrogen-containing gaseous mixture, during the course of the reaction within the reactor 10 from top to bottom. The continuous stripping off of the lighter hydrocarbonaceous material from the unconverted material increase stability of the unconverted material and prevents phasing out of asphaltene molecules from the hydrocarbonaceous mixture. The hydrocracked products formed within the course of reaction contain less of aromatic compounds compared to the unconverted material. Typically, the presences of lighter hydrocracked products along with the uncovered materials make the unconverted portion unstable and cause the asphaltene to precipitate. Further, it is a known fact that the aromatic content in the lighter hydrocracked products varies with the boiling point. The aromatic content of the lighter product is less compared to the heavier product. Therefore continuous stripping of lighter hydrocarbonaceous materials, maintain necessary aromatic concentration in the unconverted hydrocarbonaceous mixture and prevent phasing out of asphaltene molecules. The stability of asphaltene content hydrocarbonaceous mixture is generally measured by Colloidal Instability Index (CII) and it is calculated by the below formula:

$$CII = \frac{\% \text{ Asphaltemes} + \% \text{ Saturates}}{\% \text{ Resins} + \% \text{ Aromatics}}$$

By way of example, the CII value for such specific reactor 10 may be less than 0.7.

In one such example of the above-described embodiment, at least a portion of the hydrocarbonaceous feed-1 boiling below 380° C. is stripped off from the unconverted hydrocarbonaceous material during the course of travel from the top to the bottom of the reactor 10. In another such example, at least a portion of the hydrocarbonaceous feed-1 boiling below 430° C. is stripped off from the unconverted hydrocarbonaceous material during the course of travel from the top to the bottom of the reactor 10. In yet another example, at least a portion of the hydrocarbonaceous feed-1 boiling below 500° C. is stripped off from the unconverted hydrocarbonaceous material during the course of travel from the top to the bottom of the reactor 10.

In accordance with further embodiments of the present invention, FIG. 2(A) illustrates the positioning of the spray arrangement 20 in the top portion of the reactor 10 and the sparging arrangement 22 in the bottom portion of the reactor 10. As shown, a distance L2 between the spray arrangement 20 and the sparger arrangement 22 within the reactor 10 is in a range of 10 meters to 80 meters, in accordance with a preferred embodiment. In another embodiment, said distance L2 may be in a range of 30 and 60 meters. In yet another embodiment, said distance L2 is in a range of 40 and 50 meters.

In accordance with a further embodiment of the present invention, the spray arrangement 20 is positioned at a first position level L1 defined below the top exit 16, as illustrated in FIG. 2. The first position L1 may be in a range of 1500 mm to 3000 mm. Accordingly, the top exit 16 is placed in a range of 1500 mm to 3000 mm above the spray arrangement 20. Further, the reaction effluent in one embodiment or in range of, i.e., the spray arrangement 20 is positioned at the first position level L1 defined from the topmost region of the reactor 10 where the top exit 6 is in communication with the reactor 10. Further, the sparger arrangement 22 is positioned at a second position level L3 defined above a level of the bottom portion of the reaction effluent collected at the bottom portion of the reactor 10. The second position L3 may be in a range of 2000 mm to 4000 mm. Accordingly, the bottom exit 18 is placed in a range of 2000 mm to 4000 mm below the level of the bottom portion of the reaction effluent collected at the bottom portion of the reactor 10.

In accordance with further embodiment of the present invention, a diameter D of the reactor 10 may be selected in a range so as to maintain the superficial velocity of feed-2, at the entry of the reactor 10 preferably between 0.05 m/s and 1 m/s, more preferably between 0.08 m/s and 0.5 m/s and most preferably between 0.1 m/s and 0.4 m/s. Accordingly, the reactor 10 may have a diameter in a range of 0.5 to 8 m. It is disclosed here that at these superficial velocities for feed-2, there will be no turbulence in the reactor and any chance of agglomeration of the free falling liquid droplets of feed-1 is eliminated. It is well known in the art that the free falling liquid droplets velocities are determined by the terminal velocity in the surrounding continuous medium. The terminal velocity of any particle is determined by size and density of liquid droplets (feed-1) and rising velocity, viscosity, and density of gas (feed-2). Here, the free falling liquid droplets are of feed-1 falling at their terminal velocities and surrounding continuous medium is gas phase rising in the reactor 10 at the velocities mentioned herein.

Figure 3:
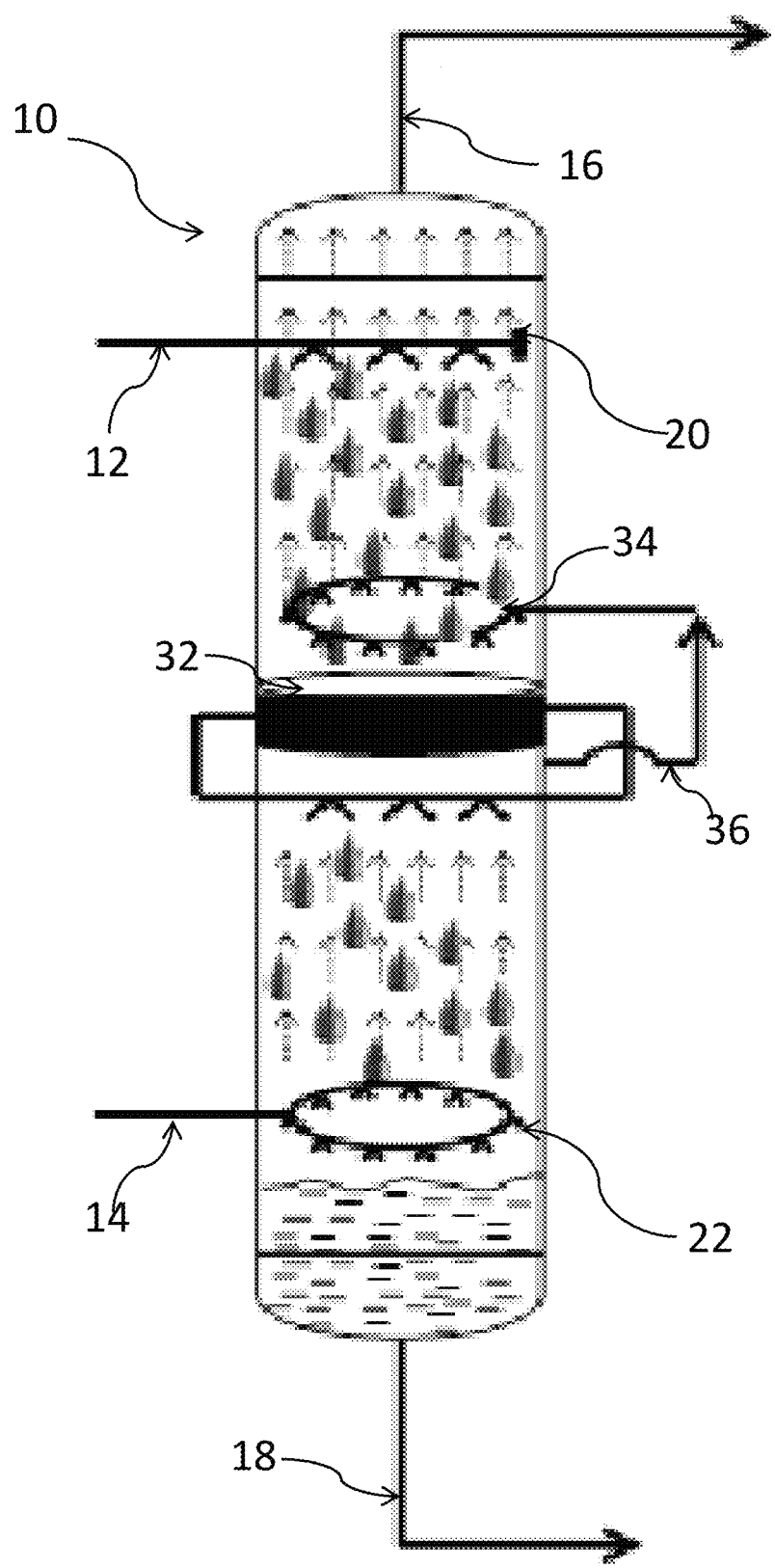
FIG. 3 illustrates a schematic representation of a hydrocracking reactor system with intermediate collection & distribution arrangement, in accordance with an embodiment of the present invention.

In accordance with yet another embodiment of the present invention, the reactor 10 may comprise of one or more intermediate collection and redistribution arrangement at one or more collection and redistribution points in the reactor 10 to collect the dispersed droplets and further redistribute the collected dispersed droplets during the downwards flow of the dispersed droplets. FIG. 3 illustrates one such embodiment where the reactor 10, as also shown in FIGS. 1 and 2, further comprises of one intermediate collection and redistribution arrangement 32 comprising an intermediate collection tray at one such collection and redistribution points in the reactor 10. The purpose of the intermediate collection and redistribution arrangement 32 positioned at one or more collection and redistribution points in the reactor 10 is to prevent the phenomenon of agglomeration of the dispersed droplets forming big sized or bigger droplets. In particular, while traveling from the top to the bottom of the reactor during the downward flow, the dispersed droplets (for e.g., dispersed droplets 26 shown in FIG. 1) corresponding to the feed-1 premixed with the catalyst gets agglomerated forming the bigger droplets. This may increase the speed of the dispersed droplets and thereby reduce residence time, conversion rate, etc. To prevent this phenomenon the intermediate collection and redistribution arrangement is made so that proper droplet size can be maintained throughout the reactor 10. The number of redistribution and collection point in a reactor may vary depending upon the total height of the reactor 10. In one embodiment, the number of redistribution and collection point in a reactor may be 3. In another preferred embodiment, the number of redistribution and collection point in a reactor may be 2. In yet another preferred embodiment, the number of redistribution and collection point in a reactor may be 1.

Due to the inclusion of the intermediate collection and redistribution arrangement 32, the flow of the gaseous feed upwards in the reactor 10 to form a continuous phase, may be interrupted. Accordingly, in one such embodiment, a new line 36, as shown in FIG. 3, may be introduced at the redistribution and collection point to allow the gaseous feed to be directed to a section of the reactor 10 preceding the intermediate collection and redistribution arrangement 32. The gaseous feed taken through the new line 36 may be mixed with other gases such as halogen as well as with hydrocarbons. In the embodiment as shown in FIG. 3, the new line 36 may be in communication with an additional sparger arrangement 34 positioned proximately above the intermediate collection and redistribution arrangement 32, where the sparger arrangement 36 may introduce the gaseous feed received via the new line 36 by way of sparging in the upward direction in the reactor 10. The sparger arrangement 36 may have sparger holes (not shown) similar to the sparger arrangements 22 explained above.

Figure 4:
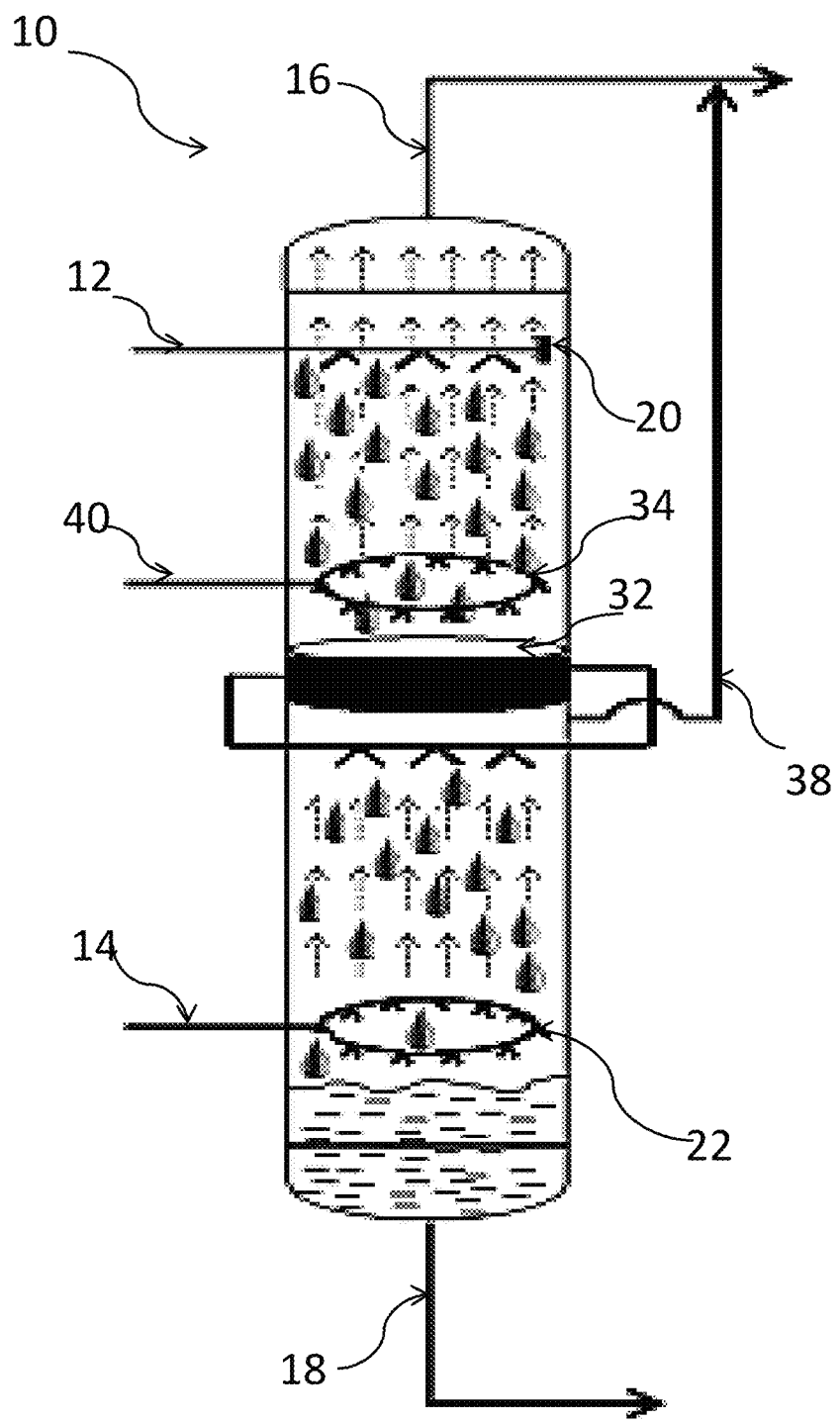
FIG. 4 illustrates a schematic representation of a hydrocracking reactor system with intermediate collection & distribution arrangement, in accordance with another embodiment of the present invention.
Figure 5:
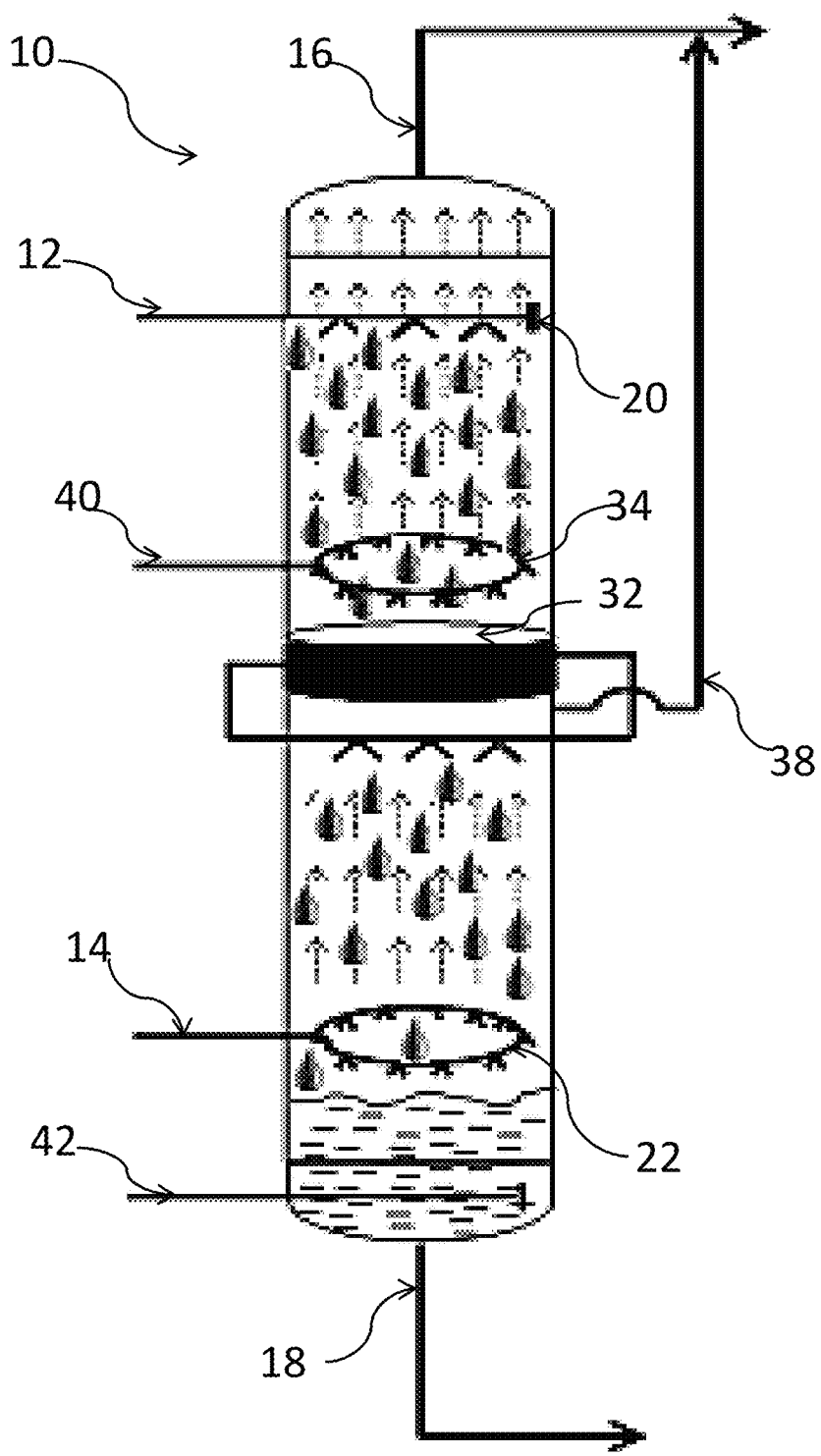
FIG. 5 illustrates a schematic representation of a hydrocracking reactor system reactor with intermediate collection & distribution arrangement and an asphaltene stabilizer injection arrangement, in accordance with another embodiment of the present invention.

In another embodiment, a new line 38, as shown in FIG. 4, may direct the gaseous feed mixed with other gases and hydrocarbons from the redistribution and collection point to the top exit 16 which is the withdrawal line for the top portion of the reaction effluent flowing in the upstream of the reactor 10. Thus, some of the lighter hydrocarbon products already cracked below the intermediate collection and redistribution arrangement 32 during the continuous stripping of the feed-1 during the upwards flow of the gaseous feed can be directed towards the top exit 16. Further, in the present described embodiment, fresh gaseous feed-2, for e.g., fresh hydrogen gas, can be introduced via inlet line 41 in communication with the additional sparger arrangement 34 positioned proximately above the intermediate collection and redistribution arrangement 32 where the sparger arrangement 34 may introduce the gaseous feed received via inlet line 41 by way of sparging in the upward direction in the reactor 10. Accordingly, in accordance with a further embodiment of the present invention, to improve the conversion of asphaltene present in the feed-1, an asphaltene stabilizer may be introduced into the reactor 10. The asphaltene stabilizer may be suitably introduced via asphaltene stabilizer injection lines into the reactor 10 at the desired positions. The desired positions for introducing the asphaltene stabilizer injection lines include at least the intermediate collection tray since during the collection and the redistribution process at the collection and redistribution arrangement 32, the asphaltene present in the feed-1 is prone to get phased out and agglomerate in the intermediate collection tray. Further, the desired position may also include the bottom of the reactor where the asphaltene present in the feed-1 are likely to get phased out and sediment at the bottom of the reactor 10. Introducing the asphaltene stabilizer may overall improve the conversion of asphaltene and also prevent sedimentation in the downstream equipment of the apparatus 10. In accordance with one aspect of the present invention, an asphaltene stabilizer injection arrangement may introduce the asphaltene stabilizer via an injection line 42, as shown in FIG. 5, at the bottom via the side-bottom of the reactor. In accordance with another aspect of the present invention, the asphaltene stabilizer injection arrangement may introduce the asphaltene stabilizer via an injection line (not shown) at the intermediate collection tray at the intermediate collection and redistribution point in the reactor. In accordance with yet another embodiment, In accordance with one aspect of the present invention, an asphaltene stabilizer injection arrangement may introduce the asphaltene stabilizer via an injection line 42, as shown in FIG. 5, via the side-bottom of the reactor 42, as well as at the intermediate tray via an injection line (not shown). The asphaltene stabilizers for the process are selected from a group of high boiling hydrocarbon mixtures with high aromatic content.

Figure 6:
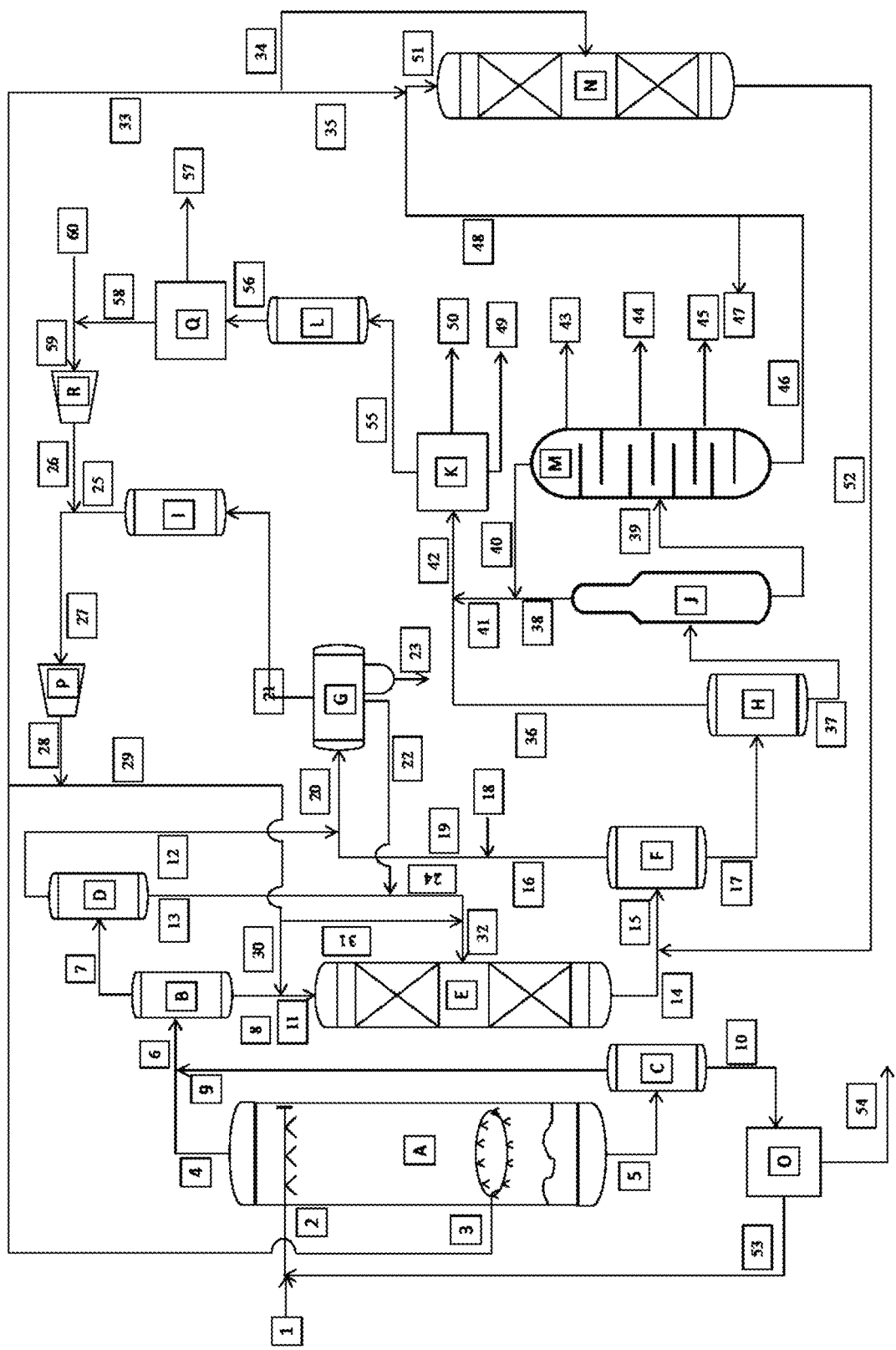
FIG. 6 illustrates a hydrocracking process scheme using a hydrocracking reactor system in accordance with an embodiment of the present invention.

FIG. 6 depicts an example hydrocracking process scheme using the reactor system for upgrading heavy hydrocarbonaceous material into lighter hydrocarbons, in accordance with an embodiment of the present invention where the reactor 10 is represented by a reactor system "A" in the illustrated FIG. 6. Referring to FIG. 6, the fresh feed-1 via line 1 and de-asphalted oil (DAO) from solvent deasphalting unit (SDAU) "O" via line 53 is introduced into reactor system "A" through line 2. The feed-2 is introduced at the bottom of "A" through line 3. Reaction takes place inside "A" and the reaction effluents are taken out through line 4 and line 5. The reaction effluent collected at the bottom of the reactor system "A" via line 5 is sent to a Heavy Bottom Hot Flash Drum (HBHFD) "C" where it is flashed and separated into 2 streams, top and bottom. The top stream predominantly contains hydrocarbonaceous material boiling below 560° C., whereas the bottom stream predominantly contains hydrocarbonaceous materials boiling above 560° C. The bottom stream is sent to De-asphalting Unit "O" via line 10. In "O" asphaltene is separated from rest of the hydrocarbonaceous material by solvent extraction technique. From "O" the asphalting reach stream is taken out via line 54 and the DAO is recycled back to "A" via line 53. The top stream from "C" is withdrawn via line 9. The top effluent, i.e., the upward flowing reaction effluent, from "A" via line 4 and "C" via line 9 is sent to Hot High Pressure Flash Drum (HHFD) "B" through line 6. The top stream of "B" (HHFD) rich in hydrogen, hydrogen sulphide (H$_2$S), ammonia (NH$_3$) and hydrocarbonaceous vapour predominantly boiling below 220° C. is withdrawn via line 7 and further flashed in Medium Temperature High Pressure Flash Drum (MHFD) "D". The Top stream of "D" rich in hydrogen is withdrawn through line 12 and sent to Cold High pressure separator (CHPS) "G" via line 20. The bottom stream of "B" and "D" is withdrawn through line 8 and 13 respectively. The bottom stream of "B" is sent to Top Catalyst Bed of Hydrotreating Reactor "E" via line 11. Hydrogen gas is added before going to "E" via line 30. The bottom stream of D is also pumped to Hydrotreating Reactor "E" but introduced at top of the 2nd catalyst bed via line 32. One stream from "G" via line 22 is also pumped to 2nd catalyst bed of reactor "E" along with bottom stream of D. The hydrogen is added to both the streams via line 31. The reactor effluent from "E" is withdrawn through line 14 and sent to Hot High Pressure Separator (HHPS) "F" via line 15 along with the effluent of Hydrocracking Reactor "N". The top stream of "F" is withdrawn through line 16 and sent to "G" via line 20. Water is added to the top stream of F through line 18. From "G", 3 steams generate, (i) the top stream rich in hydrogen is sent to ammine scrubber "I" via line 21. The boot stream containing sour water is drained via line 23 and the bottom stream containing hydrocarbonaceous liquid is withdrawn through line 22 and pumped to reactor "E". The bottom stream of "F" is withdrawn through line 17 and sent to Low Pressure Separator (LPS) "H". The bottom stream of "H" is sent to Stripper "J" via line 37. The top stream of "H" via line 36 and 42 is sent to Gas treating section "K". The top stream of "J" is withdrawn via line 38 and sent to "K" via line 41 and 42. The bottom of "J" is sent to Atmospheric Distillation unit (ADU) "M" via line 39. The ADU overhead gas via line 40, 41 and 42 is also sent to "K". From "M" naphtha stream, Kerosene stream and Gasoil stream is withdrawn through lines 43, 44 and 45 respectively. The ADU bottom is withdrawn through line 46 and sent to hydrocracker reactor "N" via line 48 and 51. A small portion of ADU bottom is also purged out via line 47. Hydrogen via line 35 is added to the feed stream 48 before entering into reactor "N" via line 51. The reaction effluent from "N" is withdrawn through line 52 and sent to F via line 15. The hydrogen-rich stream withdrawn from G via line 21 is passed through high-pressure Ammine scrubber "I" for removing H$_2$S. The scrubbed gas is withdrawn via line 25. Fresh makeup hydrogen is added to scrubbed gas via line 26 and together goes to recycle gas compressor (RGC) P via line 27. The compressed gas through line 28 is sent to a header 29 from where the hydrogen is withdrawn for reactor "A" (line 3), reactor "E" (line 30 and 31) and Hydrocracker "N" (line 33 and 34). The gas treating section "K" comprising of, sponge absorber, de-butenizer and de-ethanizer treats the off-gases from "H", "J" and "M". From "K" naphtha stream is withdrawn via line 49, LPG is taken out via line 50 and the fuel gas comprising of methane, ethane and hydrogen is sent to Low pressure amine scrubber "L" via line 55. The H$_2$S free gas is then sent to purification section "Q" via line 56. From the section "Q" hydrogen free fuel gas is sent to fuel gas header via line 57 and the purified hydrogen via line 58 and 59 is sent to makeup gas compressor "R". The make-up hydrogen is introduced into the system via line 60.

In one detailed embodiment, it is disclosed that the fresh feed-1 and catalyst mixture is mixed with deasphalted oil (DAO) before introducing to reactor A. Feed-2, the hydrogen-rich gaseous mixture is introduced into the reactor through sparger arrangement 22. It is further disclosed that at least a part of feed-2 can be also fed to the reactor "A" along with feed-1, DAO and catalyst mixture. In a further detailed embodiment, it is disclosed that the feed-1 and the catalyst mixture is pre-heated preferably between 200° C. and 400° C., more preferably between 300° C. and 400° C., and most preferably between 350° C. and 400° C. before introducing into the reactor "A". The feed-2, hydrogen-containing gaseous mixture, is heated preferably between 450° C. and 600° C., more preferably between 500° C. and 590° C., and most preferably between 550° C. and 580° C. before introducing into the reactor. In a further detailed embodiment, it is disclosed that the temperature of the reaction effluent withdrawn from the top of the reactor "A" is preferably between 350° C. and 450° C., more preferably between 350° C. and 420° C. and most preferably between 350° C. and 400° C. and the reaction effluent withdrawn from the bottom of the reactor "A" is between 400° C. and 500° C., more preferably between 430° C. and 500° C. and most preferably between 450° C. and 500° C.

The conversion for the process is defined by:
(i) Per pass conversion (across the reactor):

$$\text{Per Pass Conversion (wt \%)} = \frac{(\text{Wt of } 560° \text{ C.}-)_{TE} + (\text{Wt of } 560° \text{ C.}-)_{BE} - (\text{Wt of } 560° \text{ C.}-)_{FF}}{(\text{Wt of } 560° \text{ C.}+)_{FF}} \times 100$$

(ii) Overall conversion (across the unit):

$$\text{Overall Conversion (wt \%)} = \frac{(\text{Flow rate in kg/h})_{FF} - (\text{Flow rate in kg/h})_{Asphalt\ from\ SDAU}}{(\text{Flow rate in kg/h})_{FF}} \times 100$$

Where:
TE—Top Effluent
BE—Bottom Effluent
FF—Fresh Feed
SDAU—Solvent De-asphalting Unit It is further disclosed that the Per Pass Conversion i.e. the conversion across the reactor "A" is between 50 wt % and 100 wt %, more preferably between 80 wt % and 100 wt % and most preferably between 90 wt % and 100 wt %. It is further disclosed that at very high per pass conversion, the operability of downstream equipment become difficult, hence per pass conversion is restricted between 70 wt % and 85 wt % and more preferably between 75 wt % and 80 wt %. The overall conversion for the process is 99 wt %, more preferably above 95 wt % and most preferably above 98 wt %. It is further disclosed that DAO generated from SDA unit is recycled back to reactor A along with Fresh Feed. The recycle ratio (R) is preferably between 1 and 1.5 and most preferably between 1.1 and 1.22. The recycle ratio R is defined as $$R = \frac{\left(\text{Fresh Feed rate}, \frac{\text{kg}}{\text{h}}\right) + \left(DAO \text{ rate}, \frac{\text{kg}}{\text{h}}\right)}{(\text{Feed} - 1 \text{ rate, kg/h})}$$

In a detailed embodiment, it is disclosed that H$_2$ to Feed-1 ratio for the process is between 1000 and 2500 Nm$^3$/m$^3$, more preferably between 1200 and 2300 Nm$^3$/m$^3$ and most preferably between 1500 and 2000 Nm³/m³. It is further disclosed that the concentration of $H_2$ in Feed-2 preferably more than 85 vol. %, more preferably above 90 vol. % and most preferably above 95 vol. %.

In a detailed embodiment, it is further disclosed that the top reaction effluent of reactor "A" comprises of un-reacted hydrogen along with the hydrocarbonaceous vapour formed during the course of the reaction. It is disclosed that top effluent contains more than 80 wt %, more preferably more than 90 wt %, and most preferably more than 95 wt %, of hydrohydrocarbonaceous material boiling below 380° C. It is further disclosed that the top effluent contains more than 50 wt %, more preferably more than 70 wt %, and most preferably more than 80 wt % hydrocarbonaceous material boiling below 450° C. Top effluent also contains hydrocarbonaceous material boiling below 500° C. preferably above 20 wt %, more preferably above 40 wt %, and most preferably above 50 wt %. In a further detailed embodiment, it is discloses that the bottom effluent of reactor A, contains less than 20 wt %, more preferably less than 10 wt %, and most preferably less than 5 wt %, of hydrocarbonaceous material boiling below 380° C. The patent also discloses that bottom effluent of reactor A, contains hydrocarbonaceous material less than 50 wt %, more preferably below 30 wt %, and most preferably below 20 wt % boiling below 450° C. It further discloses that bottom effluent of reactor A, contains hydrocarbonaceous material below 80 wt %, more preferably below 60 wt %, and most preferably below 50 wt %, boiling below 500° C. The concentration of hydrocarbonaceous material boiling above 500° C. in the top effluent is below 15 wt %, more preferably below 10 wt % and most preferably below 5 wt %. It is further disclosed that the asphaltene in the top effluent is below 1000 ppmw, more preferably below 500 ppmw and most preferably below 300 ppmw. It is further disclosed that the effluent of reactor A boiling below 550° C. is further hydrotreated in reactor E for reducing sulphur below 10 ppmw. It is also disclosed that effluent reactor A boiling between 370 and 560° C. is hydrocracked in reactor N and converted to hydrocarbonaceous material boiling below 370° C. and the yield of middle distillate is further increased.

The present invention is advantageous over conventional ebullated and slurry reactors because the consumption of hydrogen is overall reduced. The hydrogen consumption increases with increase in secondary cracking. Since in the present invention, the cracked products are continuously stripped off, hence secondary cracking is reduced to a considerable extent. Further, the present invention also improves the selection towards middle distillate and heavy middle distillate. Selectivity towards middle and heavy middle distillate yield is realized because lighter hydrocarbonaceous materials are continuously stripped off from the reaction mixture and hence secondary cracking reaction is minimized to considerable amount. Further, as explained above, the coke formation reduced because the feed is distributed or sprayed as small droplets and is dispersed in the stream of hydrogen-containing gaseous mixture hence each droplet is surrounded by hydrogen-rich environment. This prevents coke precursor to grow very fast compared to conventional slurry reactor where hydrocarbon phase is in continuous phase and hydrogen is in dispersed phase. The coke formation is further reduced because coke precursors are bounded within discrete droplets and have no chance to agglomerate with other coke precursors. It is further disclosed that the coke formation for the process is below 2 wt %, more preferably below 1 wt % and most preferably below 5000 ppmw.

While specific language has been used to describe the disclosure, any limitations arising on account of the same are not intended. As would be apparent to a person in the art, various working modifications may be made to the method in order to implement the inventive concept as taught herein. The scope of the embodiments is by no means limited by these specific examples. The scope of the embodiments is at least as broad as given by the following claims.

We claim:

1. A hydrocracking reactor system for upgrading hydrocarbonaceous material into hydrocarbons, the hydrocracking reactor system comprising:
   a reactor vessel;
   a first inlet for receiving a liquid feedstock pre-mixed with a catalyst, the first inlet in communication with top of the reactor vessel;
   a second inlet for receiving a gaseous feed primarily comprising hydrogen, the second inlet in communication with bottom of the reactor vessel;
   a spray arrangement including:
      a plurality of nozzles configured to disperse the liquid feedstock pre-mixed with the catalyst from the top of the reactor vessel to obtain dispersed droplets having a predetermined droplet size less than 500 μm, and
      a plurality of concentric pipes for receiving the liquid feedstock pre-mixed with the catalyst from the first inlet, wherein the plurality of concentric pipes are arranged across a top cross-section of the reactor vessel, and wherein each of the plurality of concentric pipes has same center;
   a sparger arrangement including a plurality of sparger holes to introduce the gaseous feed comprising hydrogen from the bottom of the reactor vessel to form a continuous gaseous phase throughout a cross-section of the reactor vessel;
   a top exit in communication with the top of the reactor vessel for removing at least a top portion of reaction effluent from the reactor vessel, wherein the reaction effluent comprising one or more hydrocarbons formed during contact of the dispersed droplets with the continuous gaseous phase throughout the cross-section of the reactor vessel; and
   a bottom exit in communication with the bottom of the reactor vessel for removing at least a bottom portion of the reaction effluent from the reactor vessel.

2. The hydrocracking reactor system as claimed in claim 1, wherein the plurality of nozzles is arranged symmetrically within the spray arrangement across the cross-section of the reactor vessel, and is configured to disperse the droplets having the pre-determined droplet size in a range of 50 μm to 500 μm.

3. The hydrocracking reactor system as claimed in claim 1, wherein the spray arrangement is positioned at a first position level (L1) defined in the reactor vessel in a range of 1500 mm to 3000 mm below the top exit, the sparger arrangement is positioned at a second position level (L3) defined in the reactor vessel in a range of 2000 mm to 4000 mm above a level of the bottom portion of the reaction effluent, and a distance (L2) between the spray arrangement and the sparger arrangement within the reactor vessel is in a range of 10 meters to 80 meters.

4. The hydrocracking reactor system as claimed in claim 1, wherein the reactor vessel has a diameter in a range of 0.5 m to 8 m.

5. The hydrocracking reactor system as claimed in claim 1, wherein the reactor vessel comprising one or more intermediate collection and redistribution arrangements at one or more collection and redistribution points in the reactor vessel to collect the dispersed droplets and further redistribute the collected dispersed droplets during downward flow of the dispersed droplets.

6. The hydrocracking reactor system as claimed in claim 1 comprising an asphaltene stabilizer injection arrangement to introduce an asphaltene stabilizer into the reactor vessel.

7. A hydrocracking process of upgrading hydrocarbonaceous material into hydrocarbons, the process comprising:
heating a reactor vessel at a temperature ranging between 400° C. to 700° C.,
dispersing a liquid feedstock pre-mixed with a catalyst from top of the reactor vessel to obtain dispersed droplets having a predetermined droplet size less than 500 μm, wherein the liquid feedstock comprises the hydrocarbonaceous material,
introducing a gaseous feed primarily comprising hydrogen from bottom of the reactor vessel to form a continuous gaseous phase throughout a cross-section of the reactor vessel,
wherein at least one reaction is occurred within the droplets to form one or more hydrocarbons, wherein the at least one reaction is occurred while the droplets are falling from a spray nozzle to the bottom of the reactor vessel, and the dispersed droplets contact the continuous gaseous phase throughout the cross-section of the reactor vessel, and
wherein the at least one reaction comprising:
a thermal cracking reaction due to the temperature within the reactor vessel; and
a hydrogenation reaction due to presence of hydrogen and the catalyst within each droplet;
removing at least a top portion and at least a bottom portion of the reaction effluent from the reactor vessel.

8. The hydrocracking process as claimed in claim 7 wherein the dispersed droplets are obtained by dispersing the liquid feedstock pre-mixed with the catalyst uniformly from the top of the reactor vessel throughout the cross-section of the reactor vessel.

9. The hydrocracking process as claimed in claim 7 wherein the pre-determined droplet size is in a range of 50 μm to 500 μm.

10. The hydrocracking process as claimed in claim 7 comprising continuously stripping off at least a portion of the one or more hydrocarbons by the gaseous feed during downstream flow of the dispersed droplets in the reactor vessel.

11. The hydrocracking process as claimed in claim 7 comprising introducing an asphaltene stabilizer into the reactor vessel.

12. The hydrocracking process as claimed in claim 7 further comprising collecting the dispersed droplets and redistributing the collected dispersed droplets during downstream flow of the dispersed droplets at one or more collection and redistribution points in the reactor vessel.

13. The hydrocracking process as claimed in claim 12 comprising introducing an asphaltene stabilizer at the one or more collection and redistribution points in the reactor vessel.

14. The hydrocracking process as claimed in claim 7, wherein the gaseous feed comprising hydrogen is having a hydrogen partial pressure in the range of 70 barg to 220 barg inside the reactor vessel.

15. The hydrocracking process as claimed in claim 7, wherein the liquid feedstock having conradson carbon content more than 15 percent weight and asphaltene content more than 5 percent weight.

16. The hydrocracking process as claimed in claim 7, wherein the catalyst pre-mixed in the liquid feedstock is either in a dissolved form or uniformly distributed in the liquid feedstock droplet.

* * * * *